United States Patent [19]

Graham

[11] 4,028,724

[45] June 7, 1977

[54] READ/WRITE CHARACTER GENERATOR MEMORY LOADING METHOD

[75] Inventor: Ross Chipman Graham, Point Claire, Canada

[73] Assignee: RCA Corporation, New York, N.Y.

[22] Filed: Nov. 10, 1975

[21] Appl. No.: 630,651

[52] U.S. Cl. .......................... 358/160; 340/324 AD

[51] Int. Cl.² .......................................... H04N 5/66

[58] Field of Search ............. 178/5.8 R; 340/324 A, 340/324 AD; 358/160

[56] References Cited

UNITED STATES PATENTS

| | | | |
|---|---|---|---|
| 3,812,285 | 5/1974 | Miyata et al. | 178/5.8 R |
| 3,836,902 | 9/1974 | Okuda et al. | 340/324 AD |

*Primary Examiner*—Richard Murray

*Assistant Examiner*—Mitchell Saffian

*Attorney, Agent, or Firm*—Edward J. Norton; H. Christoffersen; George J. Seligsohn

[57] ABSTRACT

A binary quantized TV video signal of any single one of a plurality of different symbols is generated and then successively sampled at respective dot positions thereof, with the binary value of each sample being stored at a corresponding dot position of an individual one of a plurality of dot matrices of the memory, that dot matrix being located at a preselected address location of the memory. The whole process is under the control of a programmed sequence control generator which is capable of automatically controlling the loading of each of the plurality of different symbols, in turn, into its own preselected address location dot matrix of the memory.

4 Claims, 5 Drawing Figures

READ/WRITE CHARACTER GENERATOR MEMORY LOADING METHOD

This invention relates to a method for loading a read/write memory and, more particularly, to such a method for loading a read/write memory for use in a character generator system of the type which is compatible with a raster-scan television display.

Reference is made to the copending, United States patent application Ser. No. 531,613, filed Dec. 11, 1974, which issued Dec. 23, 1975 as U.S. Pat. No. 3,928,845 and is assigned to the same assignee as the present application. Patent application Ser. No. 531,613 describes a television raster-scan character generator system employing a read/write memory having a predetermined fixed overall bit storage capacity for storing each respective one of a plurality of different symbols in two-dimensional dot-matrix form at a separate address location thereof. The dot matrices of all address locations have the same size first dimension and the same size second dimension. The character generator system of the aforesaid patent application Ser. No. 531,613 further includes a multibit shift register means having a number of stages at least equal to the size of the first dimension, timing and control logic synchronized with television raster scan, and means controlled by the timing and control logic and including a refresh memory page of stored multibit symbol code defining the message to be displayed. The character generator memory is addressed during any scan line at the beginning of every successive symbol display interval with a multibit symbol dot pattern address word which includes a symbol code portion defining the character-generator-memory location of the symbol to be displayed in that symbol display interval and a scan-line code portion defining the ordinal position corresponding to the scan line then in progress in the dot matrix second dimension. In this manner, the character generator memory produces a parallel multibit dot pattern word output at least equal in size to the first dimension size of the dot matrix, with at least a portion of this dot pattern word defining the portion of the symbol to be displayed in that symbol display interval which occurs during the scan-line then in progress. Additional means controlled by the timing and control logic load stages of the shift register means with at least this portion of the parallel multibit dot pattern word output and then shift the loaded word output from the shift register means with dot clock pulses during that symbol display interval.

One of the features of the television raster-scan character generator system described in the aforesaid patent application Ser. No. 531,613 is that it employs a read/write character generator memory, rather than a read-only (ROM) character generator memory which is conventionally employed in television raster-scan character generator systems. A ROM character generator memory is limited to storing a single, predetermined alphabet of symbols. However, the use of read/write character generator memory permits any desired alphabet of symbols to be written into the plurality of dot matrices of the memory. In order to accomplish this writing, the aforesaid patent application Ser. No. 531,613 employs a suitable keyboard and data input-output control logic. The use of such an arrangement to load in each binary bit, one at a time, in the proper dot position of the proper dot matrix of the memory is a tedious and time-consuming task. The present invention is directed to a method for automatically loading the read/write character generator memory with a desired alphabet of symbols.

Briefly, in accordance with the principles of the present invention, a video signal is derived at a predetermined horizontal sync rate and at a predetermined vertical sync rate of a television frame of information including a single given one of the plurality of different symbols. The video signal of this single given one of symbols is located within a given window of the television frame, which window corresponds with a dot matrix having first and second dimensions which are an integral multiple, including unity, of the first and second dimensions of any of the dot matrices of the character generator memory. Furthermore, the window covers at least a preselected portion of the frame. The derived video signal is quantized to produce an output manifesting a first binary value in response to the video signal being at least a first given level and a second binary value in response to the video signal being below this first given level. In addition, a sampling pulse is derived at the same predetermined sync rate and vertical sync rate as the video signal so that the sampling pulse occurs at a preselected position within the window of the frame and corresponds with a predetermined ordinal line and a predetermined ordinal position along that line of the window dot matrix. The quantized output of the video signal is then sampled with the sampling pulse to determine the binary value of the quantized output sample during the occurrence of that sampling pulse. A given address location is assigned in the memory to the given one of the symbols, and the binary value of the sampled quantized output is stored at the dot position located at the predetermined ordinal line and predetermined ordinal position along that line of the dot matrix of the character memory having the assigned address location.

The features and advantages of the present invention will become more apparent from the following detailed description taken together with the accompanying drawing, in which.

Figure 1:
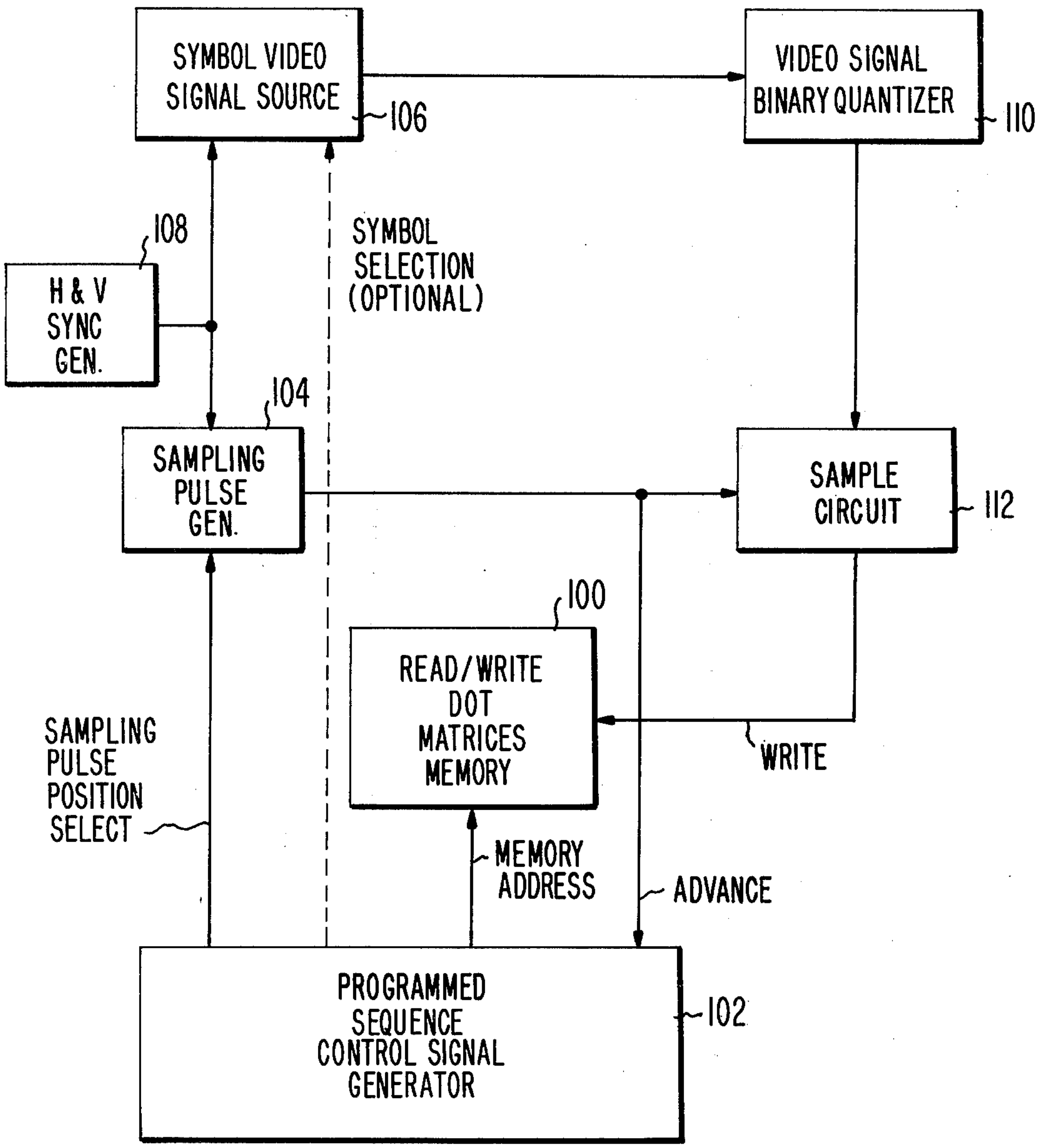
FIG. 1 is a block diagram of a generalized embodiment of the present invention.
Figure 2:
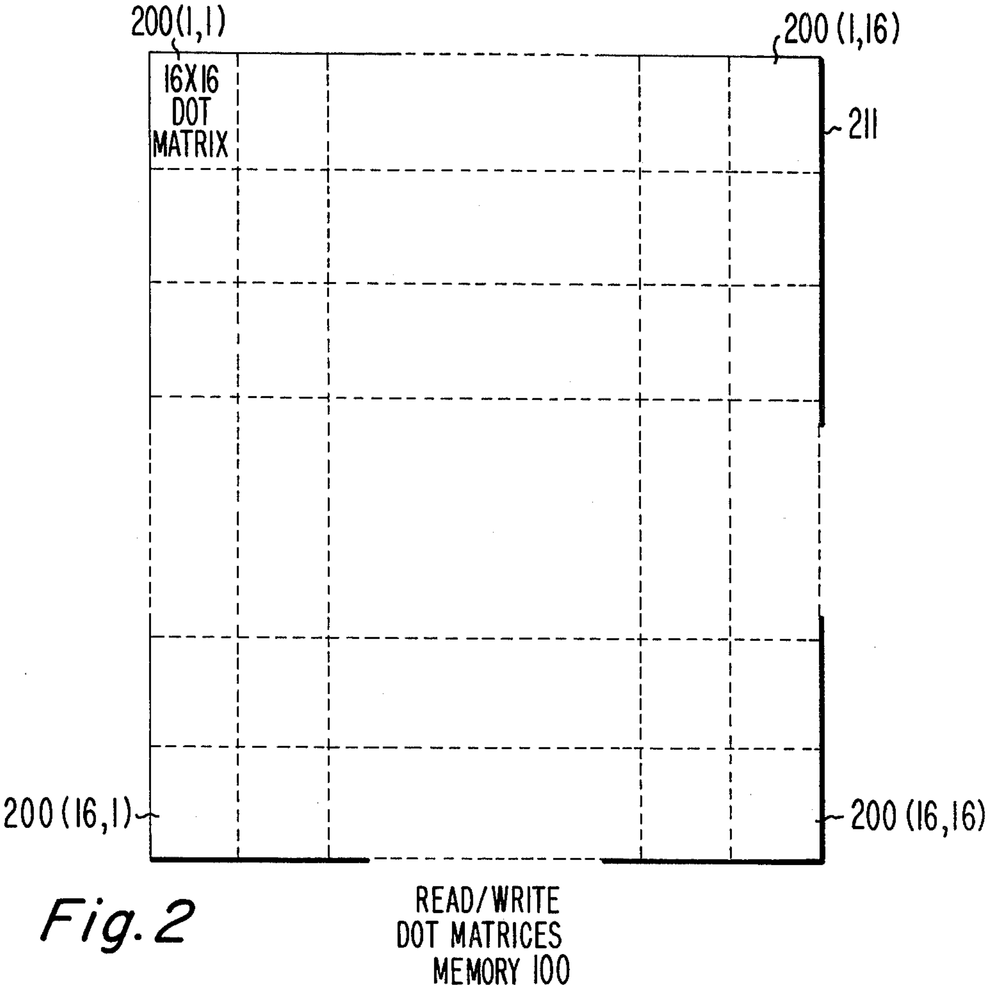
FIG. 2 is a diagram showing the organization of the read/write dot matrices memory of FIG. 1 which may be employed as the character generator memory of the character generating system.

Referring now to FIG. 1, there is shown read/write dot matrices memory 100, the memory which is to be loaded by the method of the present invention. As shown in FIG. 2, by way of example, read/write dot matrices memory 100 may have an overall storage capacity of 65,536 ($2^{16}$) bits organized into 16 × 16 dot matrices 200, with each dot matrix being composed of 16 × 16 dot positions. In practice, as known in the art, memory 100 would include suitable means responsive to binary-coded address information for access at any selected one of any of the 256 dot matrices and, further, for reaching any dot position within the selected dot matrix.

Returning to FIG. 1, read/write dot matrices memory 100 receives memory address information from programmed-sequence control signal generator 102. Although generator 102 may be a hard-wired circuit, it would normally be a more general purpose small data processing unit which is programmed in accordance with appropriate software to provide each successive one of a predetermined sequence of sampling pulse position select signals and memory address signals following the receipt of an advance signal applied thereto. Any single sampling pulse position select signal in this sequence is stored in sampling pulse generator 104 for the purpose of indicating at which point in time, during the next television field, a sampling pulse is to be generated.

More specifically, the sampling pulse generator 104 and symbol video signal source 106 are synchronized by horizontal and vertical sync signals from H and V sync generator 108. Symbol video signal source 106, which may include a television camera or a television video player, derives as a video signal output successive television frames of symbol information pertaining to a given single one of an alphabet composed of a plurality of different symbols. Depending upon the details of signal source 106, each television frame may be composed of a single television field or of two or more interlaced television fields. In any case, the video signal output from source 106 is applied as an input to video signal binary quantizer 110. Quantizer 110 produces as an output a signal having a first given binary value whenever the level of the video signal input thereto from source 106 is at at least a first given level and produces an output manifesting a second binary value whenever the video signal input thereto from source 106 is below this first given level. The quantized output from quantizer 110 is applied as a signal input to sample circuit 112.

When that point in time is reached during a television field determined by the stored sampling pulse position select signal, sampling pulse generator 104 produces a sampling pulse as an output which is applied both as a control input to sample circuit 112 and directly or indirectly as an advance signal to generator 102. In response thereto, sample circuit 112 samples the quantized video signal applied as an input thereto and produces a sample as an output therefrom which indicates, as a binary value, the relative level of the video signal output from source 106 at this point in time. The output sample from sample circuit 112 is employed directly or indirectly for writing it's binary value into that selected dot position within that selected dot matrix which has a location determined by the memory address then applied to memory 100 from generator 102. The whole process is repeated during each successive television field for each respective sampling pulse position select signal and each respective dot position in the programmed sequence. In this manner, the process is repeated for every dot in the dot matrix of read/write dot matrices memory 100 located at the memory address then being applied.

After one symbol of the alphabet of a plurality of different symbols has been completely written into the selected dot matrix, generator 102 applies another given memory address which selects another dot matrix located at a different location in memory 100 and symbol video signal source 106 is employed to provide a video signal of another one of the different symbols in the symbol alphabet. The selection of the particular symbol manifested by the video signal output from source 106 may be manually controlled or, alternatively, symbol selection may be optionally controlled by generator 102 (as indicated by the dashed line). Thus, all of the symbols in the symbol alphabet may be respectively loaded into separate dot matrices of memory 100.

Figure 3:
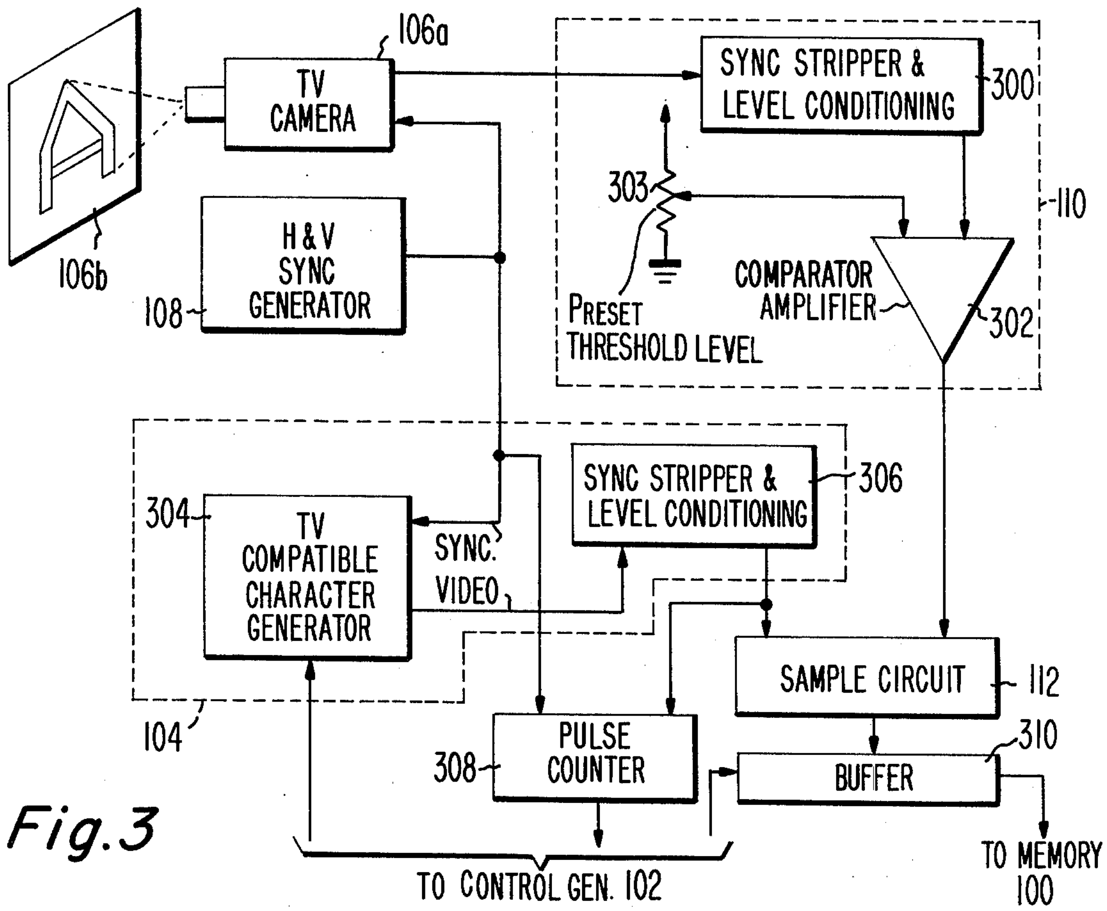
FIG. 3 is a block diagram of a specific embodiment of the present invention.

FIG. 3 shows a more specific embodiment of the arrangement shown in FIG. 1. In particular, in FIG. 3 symbol video signal source 106 comprises TV camera **106*a* which raster scans an object 106*b* constituting a given one of the symbols of the symbol alphabet, such as "A". TV camera 106*a*, which receives horizontal and vertical sync signals from generator 108, derives a video signal which includes the horizontal and vertical sync signals in addition to the information pertaining to the symbol 106*b*.**

Video signal binary quantizer 110, in the arrangement shown in FIG. 3, comprises sync stripper and level conditioning means 300, which have the video signal output from TV camera **106*a* applied as an input thereto. Sync stripper and level conditioning means 300 perform the same functions and are essentially similar to the sync separator and video amplifier circuits of a standard television set. The output from sync stripper and level conditioning means 300, which is applied as a signal input to comparator amplifier 302, consists of a video signal from which the sync signals have been removed and which has a relative intensity that has been adjusted to be within a given range of levels. Comparator amplifier 302 has a reference input applied thereto which may be preset to a desired threshold level by voltage divider 303. The preset threshold level is selected with respect to the given range of intensity levels applied as a signal input to comparator of amplifier 302 so that comparator amplifier 302 derives an output signal manifesting a first binary value whenever the intensity of the signal level is at or above the preset threshold level and manifests a second binary value whenever the intensity of the signal level is below the preset threshold level. Thus, the output from comparator amplifier 302, which may be an overdriven differential amplifier, constitutes a binary quantized video signal. This binary quantized video signal is applied as a signal input to sample circuit 112.**

Figure 5:
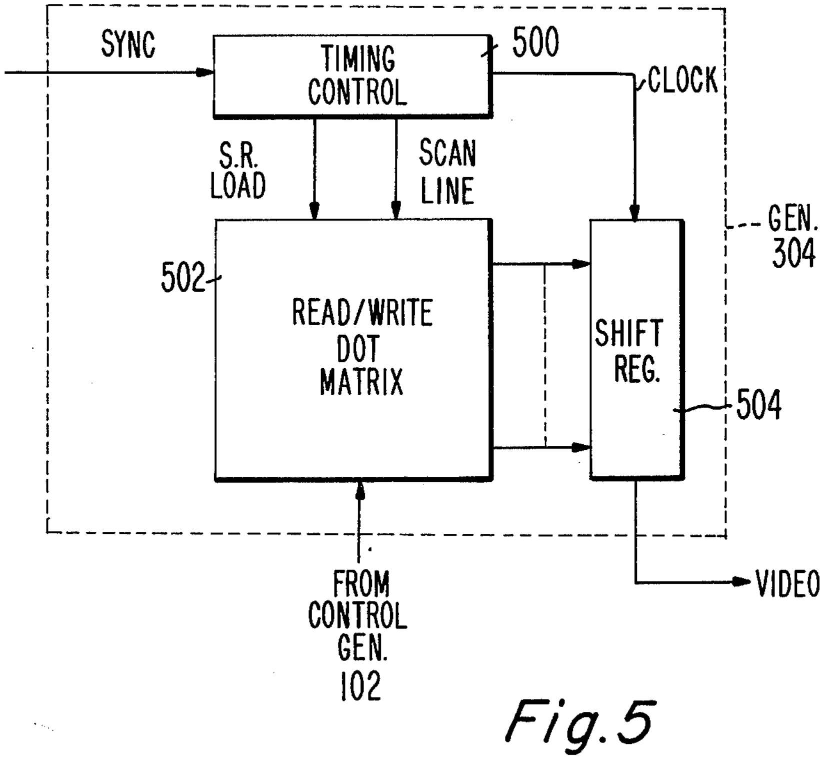
FIG. 5 shows an embodiment of the TV compatible character generator of FIG. 3.

Sampling pulse generator 104, in the arrangement shown in FIG. 3, comprises TV compatible character generator 304, which by way of example may take the form shown in FIG. 5. Character generator 304 generates clock pulses to divide each scan line into dot positions. These clock pulses are locked to the pulse from H&V sync generator 108. Specifically, as is known in the art, a horizontal scan line period is equal to a predetermined integral number of clock periods. Character generator 304 has both the sync signals from generator 108 and programmed-sequence control signals from generator 102 applied as inputs thereto.

As more fully shown in FIG. 5, character generator 304 may comprise a timing control 500 which includes a clock oscillator operating a predetermined relatively high clock frequency, such as about 10 MHz. Timing control 500 also derives scan line signals having a period equal to the television scan line in response to horizontal sync signals. In practice, H&V sync generator 108 may structurally be part of timing control 500, but has been shown separately for the purpose of functionally describing the present invention. Generator 304 further includes a read/write dot matrix 502, which has sampling pulse position selected information loaded therein from control generator 102. The output from dot matrix 502 is loaded in parallel into shift register 504 in response to a shift register load signal applied to dot matrix 502 from timing control 500. The shift register load signal occurs in response to each horizontal sync either with or without a given time delay, as the case may be. Furthermore, the given time delay may be fixed or may be adjustable. In any case, the information stored in shift register 504 is shifted out in response to shift pulses occurring at the clock frequency applied thereto to provide the sampling pulse video output from generator 304. Thus, shift register 504 acts as a parallel-to-serial converter.

Although in the arrangement character generator 304 shown in FIG. 5, the video output therefrom does not include sync signals, some forms of TC compatible character generators may include sync signals as part of the video output therefrom. In this latter case, sampling pulse generator 104 also includes a sync stripper and level conditioning circuit 306 for removing the sync information and adjusting the level of the video output. In any case, the useful portion of the video output constitutes a sampling pulse which is applied as a sampling input to sampling circuit 112 and is also applied as a counting input to pulse counter 308. Pulse counter 308 also has a reset signal (H. drive) input thereto.

More specifically, the output video may contain a number of sampling points along a single scan line each separated from the previous by at least one dot space. In this case several samples are taken by circuit 112 and saved in buffer 310. When the predetermined number of sample pulses has been counted by the pulse counter 308, an advance signal is generated to controller 102 which then stores the samples in memory 100 at the appropriate addresses.

For the case of a single sample pulse per TV field, pulse counter 308 is not required and the sample pulse is used directly as the advance signal to controller 102. The output from pulse counter 308 provides an advance signal which is fed back to control generator 102 to indicate that a valid sample pulse has been generated.

Although the sample output from sample circuit 112 may be applied directly to memory 100, normally successive samples of the symbol being viewed by TV camera 106*a* are temporarily stored in buffer 310, and are thereafter applied to a dot matrix in memory 100 only after several or all the samples of that symbol have been determined.

Figure 4:
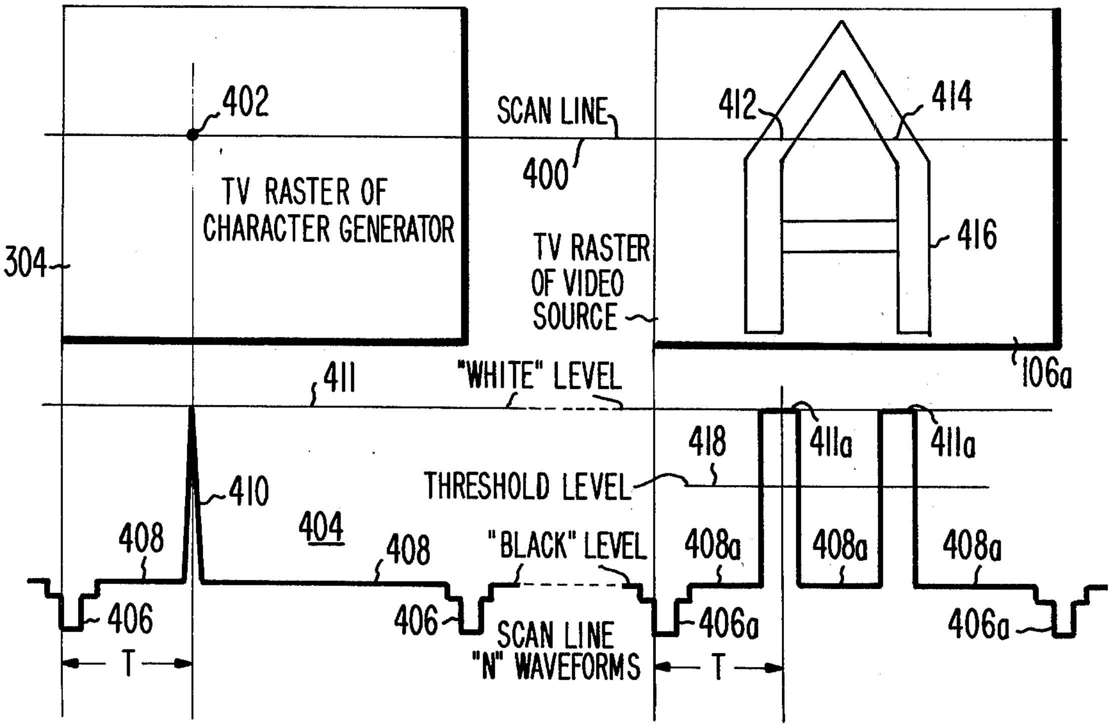
FIG. 4 is a timing diagram illustrating the operation of the specific embodiment of FIG. 3 employing the method of the present invention.

Considering now the operation of the arrangement shown in FIG. 3, reference is made to FIG. 4. Assuming that TV compatible character generator has been loaded by generator 102 to produce a sampling pulse during the dot period which begins at a time delay T after the beginning of scan line 400, the relative position of the sampling pulse in the TV raster video signal of character generator 304 is indicated by single dot 402. The actual video signal from character generator 304 during scan line 400 is indicated by timing diagram 404. As indicated in FIG. 4, timing diagram 404 comprises horizontal sync signal portion 406, which is "blacker than black", "black" level portion 408, and sample pulse portion 410, which rises from "black" level 408 to "white" level 411. It is sample pulse 410 which is applied as the sample pulse input to sample circuit 112 from sync stripper and level conditioning circuit 306.

The relative position of scan line 400 in the TV raster of video source 106*a* of symbol 106*b*, consists of the intersections 412 and 414 of scan line 400 with symbol portion 416, manifesting "A". The timing diagram of the video signal from TV camera 106*a* comprises sync signal portion 406*a*, "black" level portion 408*a* and "white" level portion 411*a*. The threshold level 418 is preset at a given value intermediate "black" level 408*a* and "white" level 411*a*. Therefore, the output from comparator amplifier 302 has a first binary value (binary ONE) during "white" level portions 411*a* which exceed threshold level 418 and has a second binary value (binary ZERO) during "black" level portions 408*a* which are below threshold level 418. Since in the example shown, sampling pulse 410 occurs during portion 412, when "white" level 411*a* is occurring, the sample in this case produced by sample circuit 112 manifests the first binary value, (binary ONE).

In practice, in performing the method of the present invention, read/write dot matrix 502 may actually comprise a certain one of the dot matrices of memory 100 which is located at a preselected address programmed into generator 102, so that the sampling pulse position select is directed to a particular dot position within this certain dot matrix of memory 100. Alternatively, read/write dot matrix 502 may be extrinsic from memory 100 and made up of only a single dot matrix, which, by way of example, may contain only 16 × 16 dot positions. In this case, each single dot position in the dot matrix is selected in turn by the programmed-sequence control signal generator. On the other hand, a more sophisticated arrangement, read/write dot matrix 502 may consist of an entire additional memory identical to memory 100, such as shown in FIG. 2. In this latter case, instead of a single dot position in a single dot matrix being selected for producing a sampling pulse, each of the respective ones of the 256 16 ×16 dot matrices may correspond with a single sampling pulse and with a single dot position in the then-addressed dot matrix of memory 100. In this latter case, the sample pulse would correspond with a predetermined region of the TV raster of video source 106*a*, with this region being made up of 16 ×16 contiguous sub-regions and sample circuit 112 would provide an output binary value equal to the weighted average of the respective binary values of the sub-regions.

The symbols that may be stored in memory 100 by the method of the present invention are not limited to alphanumeric symbols, but include any aribitrary group of different arrangements of binary dots within each dot matrix of memory 100. For instance, the symbols may comprise various mosaic elements which can be used for the purpose of generating a TV raster scan display of animated figures or other pictorial information by combining selected mosaic elements in a predetermined order, rather than conventional alphanumeric symbols used to provide a TV raster scan display of readable text material.

What is claimed is:

1. A method for loading a read/write character generator memory with a plurality of different symbols for use in displaying selected ones of said symbols on a display device exhibiting a television raster scan during readout of said memory; said memory storing each respective one of said plurality of different symbols in two-dimensional dot matrix form at a separate address location thereof with all dot matrices having the same size first dimension and the same size second dimension, whereby any dot within any dot matrix is completely specified by the address location of that dot matrix, the ordinal line along the first dimension in which that dot is located and the ordinal position along that line in said second dimension in which that dot is located; said method comprising the steps of:

a. deriving a video signal at a predetermined horizontal sync rate and a predetermined vertical sync rate of a television frame of information including a single given one of said symbols located within a given window of said frame, which window corresponds with a dot matrix having first and second dimensions which are an integral multiple including unity of the first and second dimensions of said dot matrices of said memory, said window covering at least a preselected portion of said frame;

b. quantizing said video signal to produce an output manifesting a first binary value in response to said video signal being at at least a first given level and a second binary value in response to said video signal being below said first given level;

c. deriving at said predetermined horizontal sync rate and vertical sync rate a sampling pulse which occurs at a preselected position within said window of said frame and corresponds with a predetermined ordinal line and a predetermined ordinal position along that line of said window dot matrix;

d. sampling said quantized output with said sampling pulse to determine the binary value of said quantized output sample during the occurrence of said sampling pulse;

e. assigning a given address location in said memory to said given one of said symbols, and f. storing the binary value of said sampled quantized output at the dot position located at said predetermined ordinal line and predetermined ordinal position along that line of the dot matrix of said memory having said assigned address location.

2. The method defined in claim 1, wherein television frames occur repetitively and each frame is composed of a given number of one or more television fields which occur successively at said vertical sync rate;

wherein step (c) includes the steps of deriving a respective sampling pulse during successive ones of said television fields which respective sampling pulses occur at different preselected positions within said window and correspond with different predetermined ordinal lines and different predetermined ordinal positions along said lines of said dot matrix, to thereby sample during a series of successive television frames all the dots of said dot matrix;

wherein step (d) includes the steps of successively sampling said quantized output with each of said respective sampling pulses to determine the respective binary value of each respective quantized output sample, and wherein step (f) includes the steps of storing the binary value of each respective quantized output sample at the dot located at the predetermined ordinal line and predetermined ordinal position along that line corresponding to the sampling pulse corresponding to that dot of the dot matrix of said memory having said assigned address location.

3. The method defined in claim 1, wherein step (c) includes the steps of loading a sampling pulse dot matrix having the same first and second dimensions as said window dot matrix with one binary value solely at said predetermined ordinal line and said predetermined ordinal position along that line, the remainder of said sampling pulse dot matrix being loaded with a binary value opposite the said one binary value and deriving a second video signal from said sampling pulse dot matrix in synchronism with the derivation of the video signal from said window dot matrix, whereby said second video signal comprises said sampling pulse.

4. The method defined in claim 3, further including the step of assigning a unique address location in said memory to said sampling pulse dot matrix, whereby said sampling pulse dot matrix forms part of the same memory as the memory in which said plurality of different symbols are stored.

* * * * *

UNITED STATES PATENT AND TRADEMARK OFFICE
CERTIFICATE OF CORRECTION

PATENT NO. : 4,028,724

DATED : June 7, 1977

INVENTOR(S) : Ross Chipman Graham

It is certified that error appears in the above-identified patent and that said Letters Patent is hereby corrected as shown below:

Title Page, change "[73] Assignee: RCA Corporation, New York, N.Y." to --[73] Assignee: RCA Limited, Quebec, Canada--

Signed and Sealed this

*Twenty-seventh* Day of *November 1979*

[SEAL]

*Attest:*

RUTH C. MASON
*Attesting Officer*

LUTRELLE F. PARKER
*Acting Commissioner of Patents and Trademarks*